United States Patent [19]

Forgione et al.

[11] 3,766,013

[45] Oct. 16, 1973

[54] PREPARATION OF WATER-INSOLUBLE CARRIER BOUND ENZYMES

[75] Inventors: Peter Salvatore Forgione, Stamford, Conn.; Rocco Alberto Polistina, Port Chester, N.Y.

[73] Assignee: American Cyanamid Company, Stamford, Conn.

[22] Filed: Aug. 24, 1971

[21] Appl. No.: 174,550

[52] U.S. Cl. ............... 195/63, 195/31 R, 195/68, 195/DIG. 11
[51] Int. Cl. ............................................. C07g 7/02
[58] Field of Search .................. 195/63, 68, DIG. 11

[56] References Cited
UNITED STATES PATENTS 3,294,871  12/1966  Schmitt et al. ..................... 260/900
3,674,767  7/1972  Lilly et al. ......................... 195/63 X
3,282,702  11/1966  Schreiner ........................... 195/63 X

OTHER PUBLICATIONS

Bauman et al., Preparation of Immobilized Cholinesterese for Use in Analytical Chemistry. Analytical Chemistry, Vol. 37, Nov. 11, 1965 (pp. 1378–1381) QD71I42

*Primary Examiner*—David M. Naff
*Attorney*—Frank M. Van Riet

[57] ABSTRACT

Water-insoluble, catalytically active, carrier bound enzyme materials physically dispersed throughout the interstices of the network of interconnected, interwoven fibers of polytetrafluoroethylene, and a method for their production, are disclosed.

10 Claims, No Drawings

PREPARATION OF WATER-INSOLUBLE CARRIER BOUND ENZYMES

BACKGROUND OF THE INVENTION

The binding of enzymes to suitable carriers in order to insolubilize said enzymes and thereby render them useful for the conversion of enzymatically convertible substrates has been of interest in recent years. Specifically, Silman et al, *Water-Insoluble Derivatives of Enzymes, Antigens and Antibodies*, Annual Review of Biochemistry, Vol. 35, Part II, P.D. Boyer, Editor; Annual Review Inc., Palo Alto, Calif.; pages 873–908; 1966, discuss many methods for binding enzymes to carriers, including adsorption, inclusion inside the lattice of the carrier, covalent binding and covalent cross-linking. In copending application Ser. No. 8,089, filed Feb. 2, 1970 now abandoned by one of the instant inventors, and hereby incorporated herein by reference, there is disclosed a unique class of polymer bound enzymes and a method for their production. Said class of polymers and many of those commercially available in commerce, although of high activity, tend to compact and channel when utilized, as such, in processes wherein the bound enzyme is used to convert substrates to their conversion products, especially when the bound enzyme is contained in a contact column.

SUMMARY

We have now found that the catalytic activity of enzymes bound to carriers can be maintained and the channelling and compacting of the bound enzyme can be prevented or substantially reduced by physically dispersing the bound enzyme throughout the interstices of the network of interconnected, interwoven fibers of polytetrafluoroethylene. By "carrier bound enzyme" as used herein, is meant the product produced by binding an enzyme to a carrier by any of the four mechanisms mentioned above and described by Silman et al., in said article.

DESCRIPTION OF THE INVENTION INCLUDING PREFERRED EMBODIMENTS

The compositions which are dispersed throughout the interstices of the polytetrafluoroethylene according to our invention comprise a water-insoluble, carrier having a catalytically active enzyme bound thereto. Any carrier having these properties may be utilized herein and the enzyme may be bound thereto in any known manner, i.e., those mentioned above.

The carriers for the enzymes may be polymeric or non-polymeric and still find use in the present invention. Polymers which may be used as carriers for the enzymes, including those mentioned in the above-identified publication, are such materials as aminoethylated cellulose, diazobenzyl cellulose, diazotized p-aminobenzyl cellulose, amino-s-triazine cellulose, acid chlorides of carboxylic or sulfonic acid ion-exchange resins, carboxymethyl cellulose azide, bromoacetyl cellulose, methacrylic acid-methacrylic acid-3-fluoro-4,6-dinitroanilide copolymers, the diazotized-m-aminobenzyloxy-methyl ether of cellulose, diazotized poly-p-aminostyrene, the diazotized copolymer of p-aminophenylalanine and leucine, phosgenized poly-p-aminostyrene, ethylene-maleic anhydride copolymers, polyisothiocyanate derivatives of poly-p-aminostyrene, polystyrylmercuric acetate, acrylamide-methylene-bis acrylamide copolymer gels, polyacrylamide, poly-4-hydroxy-3-nitrosytrene and the like.

Examples of carbonyl polymeric carriers which are preferred for use herein include those produced according to any known procedure from such aldehyde monomers as acrolein; α-alkyl acroleins, e.g., methacrolein, α-propylacrylein; crotonaldehyde; 2-methyl-2-butenal; 2,3-dimethyl-2-butenal; 2-ethyl-2-hexenal; 2-decenal; 2-dodecenal; 2-methyl-2-pentenal; 2-tetradecenal and the like, alone or in admixture with up to 95 percent, by weight, based on the total weight of the copolymer, of each other and/or such other copolymerizable monomers known to react therewith such as unsaturated alcohol esters, e.g., the allyl, crotyl, vinyl, butenyl, etc., esters of saturated and unsaturated aliphatic and aromatic monobasic and polybasic acids such as acetic, propionic, butyric, valeric, adipic, maleic, fumaric, benzoic, phthalic, terephthalic, etc., acids; vinyl cyclic compounds (including monovinyl aromatic hydrocarbons) e.g., styrenes, o-, m-, and p-chlorostyrenes, -bromostyrenes, -fluorostyrenes, -methylstyrenes, -ethylstyrenes, various polysubstituted styrenes, e.g., di-, tri-, and tetra-chlorostyrenes, -bromostyrenes, etc.; vinyl naphthalene, vinyl chloride, divinyl benzene, allyl benzene, vinyl pyridine, diallyl benzene, various α-substituted and α-substituted, ring-substituted styrenes, e.g., α-methyl styrene, α-methyl-p-methyl styrene, etc.; unsaturated ethers, e.g. ethylvinylether, etc.; unsaturated amides, e.g., acrylamide, methacrylamide, etc.; N-substituted acrylamides, e.g., N-methylolacrylamide, N-allyl acrylamide, N-methyl acrylamide, etc.; acrylates such as the methyl, ethyl, propyl, butyl, etc., acrylates and methacrylates; nitriles such as acrylonitrile and other comonomers shown, for example, in U.S. Pat. No. 2,657,192 mentioned hereinabove.

Examples of other preferred carbonyl polymers which may be utilized as carriers herein include those produced according to any known procedure and in amounts similar to those indicated above in regard to the aldehyde polymers from such ketone monomers as methyl vinyl ketone, methyl allyl ketone, ethyl vinyl ketone, methyl isopropenyl ketone, ethyl allyl ketone, etc., phenyl vinyl ketone, p-tolylvinyl ketone. Also, we may use such polymers as poly(vinylpyridinium ketones) and haloketones; copolymers of the above-mentioned aldehyde monomers and ketone monomers with or without the above-disclosed copolymerizable comonomers; polyacetal and the like. The molecular weights of the polymers used is not critical and those as low as 1,000 can be used.

Similarly, such polymers as the copolymers of ethylene and carbon monoxide and various glyoxal adducts, all well known in the art, can be utilized herein.

Examples of other carriers which may be used in the present invention include porous glass, asbestos, charcoal and the like. The above carrier listing is in no way to be considered as all-inclusive and any other known carriers may also be used herein.

The polymeric carriers are prepared depending, of course, upon the specific material being used, by rendering the material susceptible to reaction with the enzyme and should be hydrophilic in character. In the case of most carbonyl polymers, for example, the polymer is first made water-soluble by reaction with a suitable solubilizing agent such as a bisulfite, specifically an alkali metal or alkaline earth metal bisulfite such as sodium, potassium, calcium etc. bisulfite. The reaction is conducted at a temperature ranging from about 25°C. to about 90°C., at atmospheric pressure, although superatmospheric or subatmospheric pressure can be utilized, if desired, the process being more specifically disclosed in U.S. Pat. No. 2,657,192, hereby incorporated herein by reference. After the bisulfite treatment, the carbonyl polymer is then made hydrophilic, such as by cross-linking. By the term "hydrophilic," as used herein, is meant that the carrier is made wettable or swellable in water but is not substantially soluble therein. The materials can contain hydrophobic members or portions provided that they also have hydrophilic portions which function as such when in contact with water. Any cross-linking agent or water-insolubilizing agent can be used for this purpose with such materials as bis-diazobenzidine, bis-diazohexane, N,N'-(1,2-phenylene-bis-maleimide), phenol-2,4-disulfonyl chloride, m-xylylene diisocyanate, epichlorohydrin, p-nitrophenyl chloroacetate, tris[1-(2-methyl)aziridinyl]phosphine oxide, diamines such as hexamethylene diamine, dialdehydes such as glutaraldehyde and the like being exemplary. For example, the general procedure taught in U.S. Pat. No. 3,459,710, also hereby incorporated herein by reference, can be followed. In this method, the bisulfite-polymer adduct or reaction product is contacted with a diamine such as ethylene diamine, tetramethylene diamine, 1,6-hexane diamine, etc. at a temperature of about 0°–150°C. and in the presence of a solvent. If desired, the cross-linking step may be accomplished first and the bisulfite reaction second, the only criteria being that the resultant product is in such a state so as to allow reaction thereof with the enzyme. Insolubilizing the carrier can also be accomplished in a multiplicity of other ways such as by reaction with a polyunsaturated cross-linking agent such as divinyl benzene, etc., or any other polyfunctional compound which will cause the formation of a network of polymeric structures via reaction with the carrier through available cross-linking sites. Grafting of the polymer carriers or irradiation thereof with x-rays or γ-rays etc. can also be accomplished to render them hydrophilic. Additionally, the insolubilizing can be effected by reacting the carrier material with such agents as 4-aminophenyl sulfide hydrochloride salt, etc.

In regard to other polymeric carriers, the same procedure specified above in regard to the carbonyl polymers may be utilized if the carriers per se are not sufficiently hydrophilic to enable them to be bound to the enzyme. That is to say, some polymeric materials are not per se water-soluble and since most enzymes are denatured by organic solvents and therefore any reaction therewith must be carried out in an aqueous medium, the polymeric carriers must be rendered hydrophilic before contact with the enzyme. Reactions of this general type are shown in U.S. Pat. No. 3,271,334, also hereby incorporated herein by reference.

When the carrier polymer is per se water-soluble, the bisulfite reaction need not be conducted and the enzyme can be contacted with the carrier immediately after rendering it insoluble, such as by cross-linking, as discussed above. Water-solubilizing and cross-linking need not be accomplished, of course, if the carrier is per se hydrophilic. The basic requirement is that the polymeric carrier having the enzyme bound thereto must be hydrophilic in order that it may be utilized in the enzymatic conversion of substrates to their conversion products.

In a specific embodiment of the preparation of polymeric carrier bound enzyme products, polyacrolein, a water-insoluble polymer which contains some groups with which most enzymes are reactive, must be first contacted with a bisulfite such as sodium bisulfite in order to render it water-soluble. In such a condition, however, the polymer cannot be reacted with an enzyme because recovery of any product thereof is relatively impossible. Cross-linking of the bisulfite-polymer product, however, renders it gel-like in consistency and effectively hydrophilic so as to allow reaction with the enzyme. As a result, the bisulfite-polyacrolein product is preferably cross-linked with a diamine such as hexamethylene diamine. The result of these two reactions is believed to be that the bisulfite breaks some of the heterocyclic rings of the polyacrolein creating more enzyme-reactive aldehyde groups thereon, in addition to a series of bisulfite groups. The diamine reacts with some of these aldehyde groups with the formation of –CH=N– linkages between two polymer molecules, thereby cross-linking the polyacrolein. Reaction of the enzyme forms an adduct or covalent bond between the enzyme and the other available aldehyde groups, and also may result in reaction through the bisulfite groups. The resultant adduct is then comprised of a series of cross-linked groups, free aldehyde groups, heterocyclic bisulfite reaction groups and bound enzyme groups. Of course, when non-polymeric carriers are employed, the ultimate system, having the enzyme attached thereto in any manner such as those described in the above-cited article, may also be used herein and need not be hydrophilic. Therefore such carriers as glass, asbestos, charcoal, etc., need not be first rendered hydrophilic before use in the production of our novel products.

According to the present invention, the carrier, is admixed with the polytetrafluoroethylene and an inert, solid, water-soluble component or material and the resultant mixture is then subjected to high shear in order to fibrillate the PTFE. The purpose of the inert, solid, water-soluble component in the mixture is to enable the enzyme to ultimately be contacted with as many available surfaces of the carrier as possible, as more fully explained hereinbelow.

The PTFE may be admixed with the carrier and the water-soluble material in the form of a powder or latex, the fibrillation thereof being conducted in a manner known in the art, e.g., such as that taught in U.S. Pat. No. 3,294,871, hereby incorporated herein by reference.

As set forth in said patent, the fibrillation of the PTFE is produced by subjecting the PTFE to a shearing action whereby the PTFE tends to become fibrous in consistency and is present in the form of finely divided microfibrous and submicrofibrous particles having diameters ranging from about 100A. up to about 2 microns.

Examples of suitable normally solid water-soluble materials which may be used include such compounds as the chlorides, sulfates, iodides, nitrates, acetates, persulfates etc. of aluminum, barium, calcium, copper, iron, lithium, magnesium, potassium, sodium, and the like; polymeric materials such as methyl cellulose, carboxymethyl cellulose, ethylene oxide polymers, polyvinyl alcohol, acrylamide polymers, starch, the sodium salts of polymeric acids and the like, the particular material being used forming no part of the instant invention and being well within the state of the art, as set forth, for example, in British Pat. Nos. 954,202 and 1,199,566, incorporated herein by reference. By "inert" is meant that the water-soluble material does not function to influence or interfere with the enzymatic function of the enzyme or carrier to which it is bound.

Once the carrier PTFE water-soluble material mixture has been treated such that the PTFE becomes fibrillated, the carrier and water-soluble material being primarily dispersed throughout the interstices of the interconnected, interwoven fibers of the PTFE as a result thereof, the inert, water-soluble material is extracted, washed or otherwise removed from the resultant system by contacting the system with water, at a temperaute ranging from about 0°–150°C. In this manner, the carrier surfaces are more extensively exposed by the voids left by the washed-out solid and are therefore more susceptible to contact and ultimate binding thereof with the enzyme desired. Under normal conditions, from about 50 to about 100 percent of the water-soluble material can be extracted.

The enzyme is bound to the carrier preferably as taught in the above-identified patent application. That is to say, the binding of the enzyme to the carrier after fibrillation of the PTFE and removal of the water-soluble material is almost always necessary. In this manner, the enzyme is not destroyed by the high temperatures required during the fibrillation process. If an enzyme is to be used however, which can withstand such high temperatures and remain active, of course, binding thereof to the carrier may be accomplished before fibrillation.

When polymeric carriers are being used, especially those which must be first modified before the enzyme may be bound thereto, it is also possible to effect all modifications of the polymer carrier after the fibrillation process is terminated since the availability of reaction sites in the carrier due to the water-soluble material extraction allows modification, and consequently effective enzyme bonding, to be conducted.

If desired, once the enzyme has been bound to the carrier which is dispersed throughout the fibrillated PTFE, the resultant composition is formed into an appropriate configuration for use. For example, the composition may be formed into sheets from which pellets etc. may be punched, the composition may be extruded into rods etc. which are then pelletized as is known in the art, and the like.

Alternatively, although it is permissible to bind enzyme to the carrier before the fibrillated PTFE-carrier composition is rendered susceptible for final use, such as by sheeting or pelletizing as mentioned above, it is generally preferred that the composition be formulated into this final configuration even before modification of the carrier, if necessary, and binding of the enzyme thereto in order to assure that the maximum quantity of enzyme remains bound on the carrier.

The enzyme is preferably bound to the carrier at a temperature below that at which it, the enzyme, is deactivated. The temperatures at which specific enzymes are deactivated are well known to those skilled in the art and therefore need not be enumerated herein. Suffice it to say that generally temperatures below about 75°C., preferably from about 5°C. to about 65°C., should be used. The binding is preferably carried out in the presence of buffers to control the pH of the reaction mixture at a desired level and with agitation, the particular pH being governed by the particular enzyme being bound, according to known techniques.

The concentrations of inert, water-soluble filler material and carrier should range from about 50 to about 95 percent, by weight, of the filler material and from about 5 to about 50 percent, by weight, of the carrier. In regard to the PTFE, from about 1 to about 50 percent, by weight, preferably from about 1 tp about 15 percent, by weight, based on the weight of the carrier, should be employed.

Exemplary of the enzymes which may be utilized herein include proteolytic enzymes, hydrolases, amylases, dehydrogenases, kinases, oxidases, deaminases, amidases, antigens, antibodies, etc., including lactic dehydrogenase, creatine, phosphokinase, trypsin, papain, alk. phosphatase, amyloglucosidase, dextranase, glucose oxidase, glucose isomerase, amidase, penicillin amidase, chymotrypsin, $\beta$-galactosidase, pyruvate kinase, ficin, pepsin, carboxypeptidase, streptokinase, plasminogen, urease, invertase, alcohol dehydrogenase diastase, $\beta$-glycosidase, maltase, aldolase, lactase, amygdalase, lipase, steapsin, erepsin, zymase, catalase, melibiase, pectolase, protease, bovine erythrocyte and/or horse serum chlolinestrerase, tyrosinase, L-asparaginase, glucose isomerase, cytase, adenase, guanidase, carboxylase, inulase, vinegar oxidase aldehydase, rhamnase, myrosinase, phytase, tannase, carbamase, nuclease, guanase, adenase, thrombase, chymase, cozymase and the like.

As mentioned briefly above, carrier bound enzymes generally become compacted or channelled when in use and in such a condition cannot effectively function in the normal (natural) manner so as to convert substrates to their usual conversion products. We have found that by dispersing the carrier bound enzyme throughout the interstices of the fibrillated PTFE, as discussed extensively above, the channelling is materially reduced and the necessity for repacking or agitation of columns containing the bound enzyme during converting processes is obviated.

The fibrillated PTFE having the carrier bound enzyme dispersed therethrough can be packed in a suitable reaction column while still retaining the catalytic activity of the enzyme. Thus, for example, polymer bound invertase can be dispersed throughout the interstices of polytetrafluoroethylene which has been fibrillated, packed in a suitable column and can then be utilized to continuously convert sucrose to invert sugar. The catalytic activity of the invertase has thereby been maintained and the need for repacking or continuously agitating the column so as to allow continual and complete contact of the sugar with the enzyme is done away with. By "catalytically active" or "active catalytic activity," as utilized herein, is meant the ability or availability of the bound enzyme to convert a particular substrate to its usual conversion product.

Incorporation of various preservatives such as antimicrobials, antioxidants, antibiotics etc., into the bound enzymes for the prevention of bacteria formation, fungal growth etc., as is known in the art, may also be effected in concentrations of less than about 1.0 percent, by weight, based on the total weight of the bound enzyme. Examples of suitable additives include benzoic acid and its sodium and potassium salts; alkyl esters of p-hydroxybenzoic acid; propionates such as sodium propionate; sodium bisulfite; sodium metabisulfites; sodium diacetate; o-phenylphenol; butylated hydroxyanisole; lecithin; citrates such as monoglyceride citrate, stearyl citrate, etc.; oxytetracycline chlortetracycline; benzyl alcohol; calcium sorbate; sorbic acid, mixtures thereof and the like.

The following examples are set forth for purposes of illustration only and are not to be construed as limitations on the present invention except as set forth in the appended claims. All parts and percentages are by weight unless otherwise specified.

EXAMPLE 1 (Comparative)

0.88 Part of 1,6-hexane diamine, containing 3 parts of water, is slowly added, with stirring, to 44 parts of a 10 percent solution of polyacrolein-sodium bisulfite adduct (m.w. 80,000). The mixture is then heated to 85°C., for 20 minutes and the yellow hydrophilic product which forms is then washed until neutral with distilled water and filtered.

The wet hydrophilic adduct thus obtained is divided into two equal portions, one of which is suspended in 50 parts of water and reacted with 0.104 part of invertase (twice recrystallized) which had been first dissolved in 4 parts of water. The enzyme reaction mixture (pH 6.5) is gently stirred for 18 hours at 10°C. and the resulting hydrophilic covalently bound enzyme polymer adduct is then washed free of unreacted enzyme. Assay of the hydrophilic enzyme-polymer adduct shows high activity with sucrose solution, in the form of the filtered wet cake. This cake is packed in a reaction column and a sucrose solution is continuously charged to the column. After 72 hours of continual operation, the bound enzyme is channelled to such an extent that conversion of the sucrose to invert sugar drops from 92 to 60 percent.

EXAMPLE 2

The remaining portion of wet adduct of Example 1 is dried under vacuum at 40°C. for about 10 hours to remove surface water. The adduct then still comprises about 80 percent water. The adduct is then admixed with 0.5 weight percent of polytetrafluoroethylene (PTFE) emulsion, i.e., an amount equivalent to about 2.5 percent, by weight, of dry olefin polymer and 50 percent of fine sodium chloride. The mixture is then milled at 190°–210°F. on a pre-heated rubber mill in order to drive off excess water and produce complete fibrillation of the PTFE which thereby binds the mass into a coherent calendered sheet. Pellets of one-fourth inch diameter are then punched from the sheet and extracted with water for about 10 hours. The pellets are then impregnated with a solution of invertase (0.104 part in 4 parts of water) by soaking at 10°C. for 24 hours at pH 6.8.

The pellets are then packed into a reaction column and a sucrose solution is continually charged thereto as in Example 1. After 850 hours, the conversion of sucrose to invert sugar drops from 86 to 79 percent.

EXAMPLE 3

The procedure of Example 2 is again followed except that the sodium chloride is replaced by an equivalent amount of sucrose. Similar results are achieved upon contacting the resultant pellets with a sucrose solution.

EXAMPLE 4

Replacement of the sodium chloride of Example 2 with a commercially available, low molecular weight poly(ethylene oxide) results in a similar slight reduction of percent conversion of sucrose to invert sugar.

EXAMPLE 5

Following the procedures of Examples 1 and 2, dispersed polyacrolein bound glucose oxidase is prepared. The sucrose of Example 2 is replaced with 10.0 parts of a 40 percent glucose solution. After a similar length of time in a packed column, the dispersed adduct retains 92 percent of its activity. A similar column of non-dispersed adduct shows channelling and unsatisfactory conversion in 48 hours.

EXAMPLE 6

The procedure of Examples 1 and 2 are again followed except that the enzyme used is glucoamylase. The column of non-dispersed adduct loses its activity in 2 ½ days while the dispersed adduct is active to the extent of 30 percent of its original activity in 2 ½ days.

EXAMPLE 7

The procedure of Example 2 is again followed except that an acrolein-sytrene (93.8:6.2 weight ratio, respectively) copolymer is used in place of the polyacrolein thereof. After dispersion in the PTFE and introduction into a column, the bed functions effectively in the conversion of sucrose to invert sugar for 25 days without repacking or substantial agitation.

EXAMPLES 8–11

Replacement of the polyacrolein of Example 2 with (8) an acrolein-acrylonitrile (93.1:6.9) copolymer, (9) an acrolein-acrylic acid (85:15) copolymer, (10) polymethacrolein and (11) a methacrolein-styrene (50:50) copolymer results, in each instance, in an effectively dispersed adduct which functions catalytically without repacking or stirring for over 720 hours.

EXAMPLE 12

10 Parts of poly(methylvinyl ketone) are treated with 80 parts of water containing 8 parts of sodium bisulfite at pH 5.8 at 65°C. for 18 hours over a nitrogen atmosphere. The resulting bisulfite adduct is then treated with 1.6 parts of ethylene diamine dissolved in 16 parts of water, with stirring, for 25 minutes at 65°C. The hydrophilic polymer is then washed to neutral pH and filtered. The wet cake is dried and dispersed into PTFE as set forth in Example 2 with 40 percent of starch. After extraction of the starch for 12 hours, and contacting with invertase ($k=0.6$) at 18°C. for 16 hours, the PTFE containing the bound enzyme polymer adduct is pelletized, packed into a column and contacted with 10 percent aqueous sucrose solution for 280 hours. The dispersed adduct affords 84 percent conversion to invert sugar.

Following the procedures of Example 2 or Example 12 except that various copolymers or other homopolymers are substituted for the polymers utilized therein, bound invertase compositions are prepared, dispersed throughout the interstices of the network of interconnected, interwoven fibers of fibrillated PTFE contacted with a 15 percent aqueous sucrose solution and used in a packed column for the conversion of sucrose to invert sugar. The results are set forth in Table I, below.

TABLE I

| Ex. | Carrier | No. Hours Without Need for Repacking or Substantial Agitation of Packed Column |
|---|---|---|
| 13 | Acrolein-β-allyloxyethanol (80/20) | 600 |
| 14 | Acrolein-methylvinyl ketone (45/55) (m.w. 1400) | 575 |
| 15 | Poly(vinylethyl ketone) | 435 |
| 16 | Poly(isopropenylmethyl ketone) | 360 |
| 17 | Acrolein-ethyl acrylate-styrene (25/20/55) | 720 |
| 18 | Methylvinyl ketone-vinyl acetate (5/95) | 300 |
| 19 | α-methyl acrolein-methyl methacrylate (50/50) | 440 |
| 20 | Acrolein-vinyl acetate (60/40) | 700 |

EXAMPLE 21

10 Parts of wet (~10 percent solids) cross-linked polyacrolein-sodium bisulfite addition complex dispersed in PTFE (as prepared in Examples 1 and 2) are suspended in 40 parts of water at pH 3.5 and reacted with 0.110 part of crystalline trypsin, dissolved in 4 parts of water. The reaction mixture is stirred for 18 hours at 10°C. and at the end of this time the resulting covalently bound trypsin adduct is washed until free of unbound enzyme. Analysis of the washings at 280 mμ indicates that 78.2 percent of the enzyme is bound to the polymer. When packed in a column utilizing benzoyl arginine ethyl ester (BAEE) substrate, the enzyme capsules are shown to be effective after 18 days of continual use.

EXAMPLE 22

2.5 Parts of poly(isopropenylmethyl ketone) are stirred with 25 parts of water containing 2.1 parts of potassium metabisulfite at pH 5.8 for 16 hours at 75°C. over a nitrogen atmosphere. At the end of this time, 1.3 parts of 2-(2-aminoethyl)-5(6)-aminoethylbicyclo - 2.2.1 heptane in 5 parts of water are added to the above reaction mixture and stirred at 80°C. for 25 minutes. The hydrophilic adduct which results is washed to neutral pH and filtered. The wet cake is dispersed throughout the fibers of PTFE as in Example 2 and then suspended in 30 parts of water and reacted with 0.025 part of glucose oxidase dissolved in 2 parts of water at 10°C. for 18 hours. The resultant covalently bound enzyme is washed free of unbound glucose oxidase with cold distilled water and filtered. The results are similar to those shown in Example 2.

Following the techniques of the previous examples, various other enzymes are bound to polymeric materials to produce a hydrophilic composition after dispersion of the materials in PTFE. In each instance, the activity and freedom from channelling of the resultant products is excellent. The results of these runs are set forth in Table II, below.

TABLE II

| Example | Enzyme Bound As in Example No. | Enzyme | Bound Enzyme Dispersed As in Example No. |
|---|---|---|---|
| 23 | 9 | catalase | 3 |
| 24 | 18 | rennin | 4 |
| 25 | 7 | L-asparaginase | 2 |
| 26 | 12 | tyrosinase | 3 |
| 27 | 1 | lipase | 4 |

EXAMPLE 28

A commercially available polymer bound enzyme comprising chymotrypsin on carboxymethyl cellulose is dispersed in PTFE as in Example 2 (except that potassium nitrate is used as the inert, water-soluble material) and suspended in a 1.0 percent aqueous casein solution at 5°C. The activity of a column packed with the resultant pellets is evident 26 days after continual operation. Substantially no channelling is observed.

Examples 29–40

Other water-insoluble carrier bound enzymes are dispersed throughout PTFE or other polyhalogenated polyolefins using various inert, water-soluble as specified below and are utilized in the conversion of substrates to their normal conversion products. In each instance, minimum channelling results and the activity of the encapsulated enzyme remains nearly normal after 17 ½ days. The carrier bound enzymes utilized are:

29. trypsin bound to bromoacetyl cellulose in a 1.0 percent aqueous casein solution and dispersed as in Example 7 using sodium persulfate as the extracted material.

30. glucose isomerase adsorbed on asbestos in a 5.0 percent aqueous glucose solution and dispersed as in Example 2 using methyl cellulose as the extracted material.

31. L-asparaginase adsorbed in the pores of finely divided porous glass in a 2.0 percent aqueous L-asparagine solution and dispersed as in Example 7 using polyacrylamide as the extracted material.

32. papain covalently coupled to the water-insoluble diazonium salt of a p-amino-DL-phenylalanine-L-leucine copolymer in a 1.0 percent aqueous hemoglobin solution and dispersed as in Example 2 using carboxymethyl cellulose as the extracted material.

33. ficin bound to carboxymethyl cellulose in a 1.0 percent aqueous casein solution and dispersed as in Example 2.

34. pepsin bound to poly-p-aminostyrene in a 1.5 percent aqueous casein solution and dispersed as in Example 2 using magnesium sulfate as the extracted material.

35. papain bound to collagen cross-linked with benzidine in a 1.0 percent aqueous gelatin solution and dispersed as in Example 2 using aluminum acetate as the extracted material.

36. trypsin adsorbed on charcoal in a 1.5 percent aqueous hemoglobin solution and dispersed as in Example 2.

37. chymotrypsin bound to p-amino -DL-phenylalanine-L-leucine copolymer in a 1.0 percent aqueous casein solution and dispersed as in Example 2 using an ethylene oxide copolymer as the extracted material.

38. chymotrypsin bound to p-aminobenzyl cellulose in a 1.0 percent aqueous casein solution and dispersed as in Example 2.

39. glucose isomerase bound to carboxymethyl cellulose azide in a 15 percent aqueous starch solution and dispersed as in Example 2 using poly(acrylic acid) as the extracted material.

40. invertase bound to methacrylic acid-methacrylic acid-3-fluoro-4,6-dinitroanilide copolymer in a 10 percent aqueous sucrose solution and dispersed as in Example 2.

We claim:

1. A method which comprises (1) mixing a water-insoluble carrier and a water-soluble, inert material with polytetrafluoroethylene, (2) fibrillating the polytetrafluoroethylene by shearing it into finely divided microfibrous and submicrofibrous particles having diameters ranging from about 100A. to about 2 microns, (3) extracting the inert, watersoluble material and (4) binding a catalytically active enzyme to the carrier.

2. A method according to claim 1 wherein said carrier is a carbonyl polymer.

3. A method according to claim 2 wherein said carbonyl polymer is polyacrolein.

4. A method according to claim 1 wherein said enzyme is glucose isomerase.

5. A composition comprising a fibrillated polytetrafluoroethylene having a water-insoluble, catalytically active, carrier-bound enzyme material physically dispersed throughout the interstices of the network of the interconnected, interwoven fibers thereof produced by the process of claim 1.

6. A composition according to claim 5 wherein said enzyme is glucose isomerase.

7. A composition according to claim 5 wherein said enzyme material is glucose oxidase.

8. A composition according to claim 5 wherein said carrier is a carbonyl polymer.

9. A composition according to claim 8 wherein said carbonyl polymer is polyacrolein.

10. A composition according to claim 5 wherein said enzyme is rennin.

* * * * *